US012807465B2

(12) United States Patent
Terada

(10) Patent No.: US 12,807,465 B2
(45) Date of Patent: Nov. 24, 2026

(54) MOBILE ROBOT SYSTEM

(71) Applicant: KABUSHIKI KAISHA TOSHIBA, Tokyo (JP)

(72) Inventor: Akihito Terada, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 200 days.

(21) Appl. No.: 18/771,495

(22) Filed: Jul. 12, 2024

(65) Prior Publication Data

US 2024/0359959 A1 Oct. 31, 2024

Related U.S. Application Data

(63) Continuation of application No. PCT/JP2023/000791, filed on Jan. 13, 2023.

(30) Foreign Application Priority Data

Jan. 14, 2022 (JP) ................................ 2022-004662

(51) Int. Cl.
*B66F 9/06* (2006.01)
*B66F 9/075* (2006.01)

(52) U.S. Cl.
CPC .......... *B66F 9/063* (2013.01); *B66F 9/07572* (2013.01)

(58) Field of Classification Search
None
See application file for complete search history.

(56) References Cited

U.S. PATENT DOCUMENTS 5,693,286 A 12/1997 Hatanaka et al.
11,299,146 B2 * 4/2022 Sadamoto ............ G05D 1/2427
2018/0215540 A1 * 8/2018 Tanaka .................. B25J 13/086
(Continued)

FOREIGN PATENT DOCUMENTS

JP 2-46800 U 3/1990
JP 3-166072 A 7/1991
(Continued)

OTHER PUBLICATIONS

International Search Report issued Mar. 7, 2023 in PCT/JP2023/000791 filed Jan. 13, 2023, 3 pages (with English Translation of Categories of Cited Documents).

*Primary Examiner* — Michael S Lowe
(74) *Attorney, Agent, or Firm* — Oblon, McClelland, Maier & Neustadt, L.L.P.

(57) ABSTRACT

A mobile robot system includes a placement platform, and a mobile robot configured to transfer a workpiece placed at a prescribed position of the placement platform, which includes a guide including an opening part having an opening greater than a prescribed width and a body part having the prescribed width. The mobile robot includes an arm part configured to transfer the workpiece placed at the prescribed position, two or more rotatable rollers with mutually-parallel rotation axes arranged along one straight line crossing an extension direction of the rotation axes, an omni-directionally movable moving part, and a controller configured to drive a drive part to move the mobile robot so that the body part receives at least two of the rollers. The guide is positioned so that the arm part can transfer the workpiece placed at the prescribed position when the body part receives the at least two rollers.

9 Claims, 15 Drawing Sheets

(56) References Cited

U.S. PATENT DOCUMENTS

| | | | | |
|---|---|---|---|---|
| 2019/0329978 | A1 | 10/2019 | Li et al. | |
| 2020/0223631 | A1 | 7/2020 | Azumi | |
| 2020/0290603 | A1* | 9/2020 | Sadamoto | B60W 30/143 |
| 2021/0246961 | A1 | 8/2021 | Inuzuka et al. | |

FOREIGN PATENT DOCUMENTS

| | | | |
|---|---|---|---|
| JP | 3-71356 | B2 | 11/1991 |
| JP | 5-169264 | A | 7/1993 |
| JP | 8-324993 | A | 12/1996 |
| JP | 9-52196 | A | 2/1997 |
| JP | 9-161750 | A | 6/1997 |
| JP | 2004-330998 | A | 11/2004 |
| JP | WO 2019/221098 | A1 | 11/2019 |
| JP | 2020-104198 | A | 7/2020 |
| JP | 2020-111160 | A | 7/2020 |
| JP | 2021-100887 | A | 7/2021 |

* cited by examiner

FIG. 11
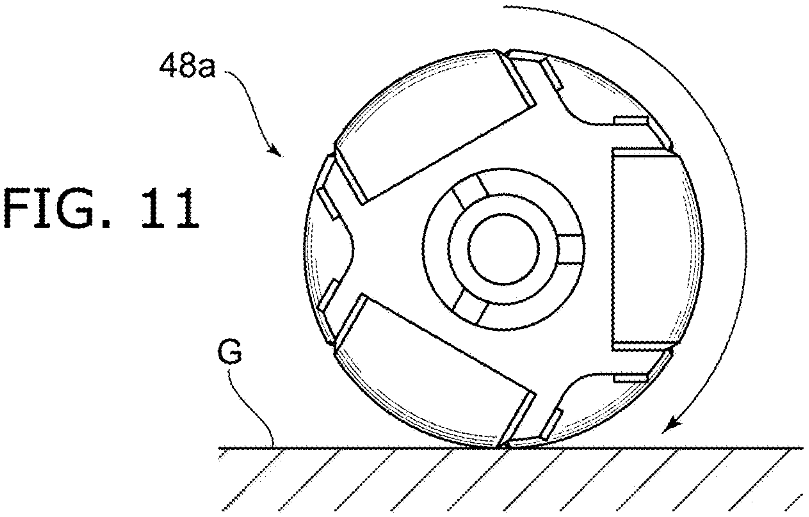
FIG. 12
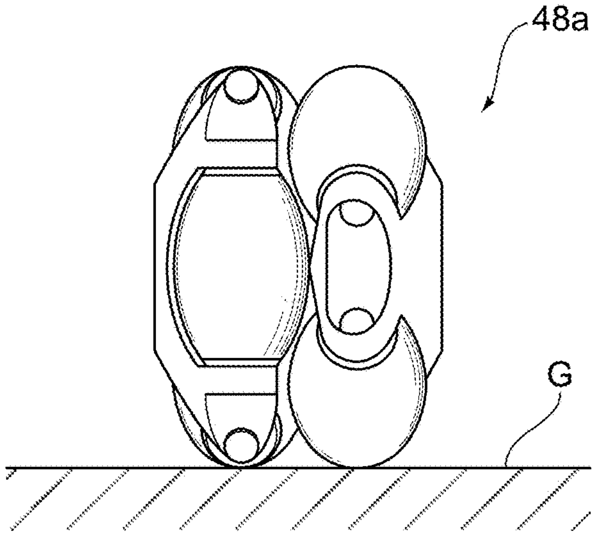
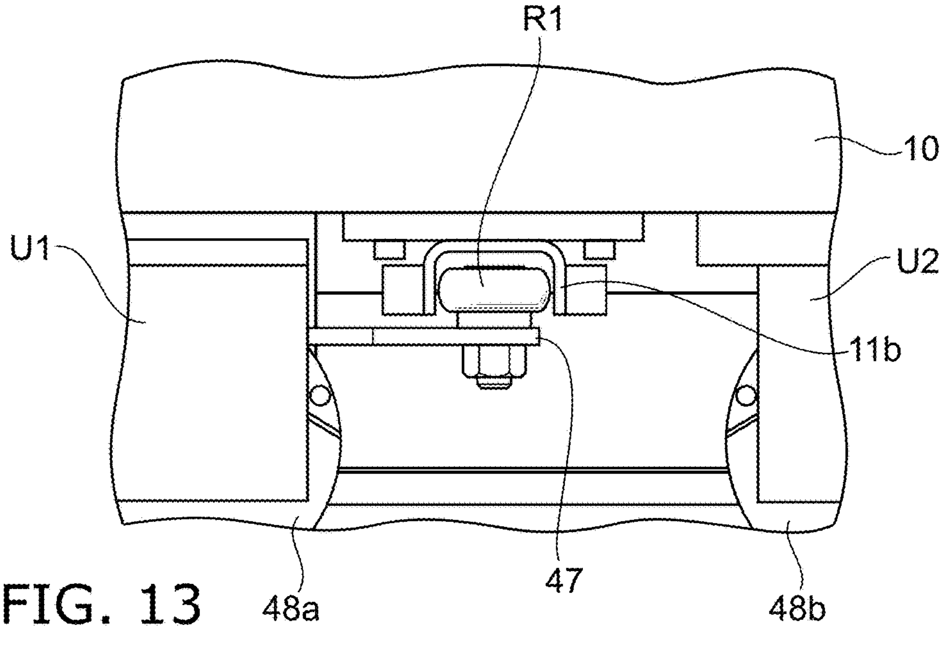
FIG. 13

MOBILE ROBOT SYSTEM

CROSS-REFERENCE TO RELATED APPLICATIONS

This application is based upon and claims the benefit of priority from Japanese Patent Application No. 2022-4662, filed on Jan. 14, 2022; the entire contents of which are incorporated herein by reference.

FIELD

Embodiments described herein relate generally to a mobile robot system.

BACKGROUND

In known technology of a mobile robot in which a handling robot is mounted to an unmanned vehicle, the mobile robot uses a sensor to read an image of two marks provided at different corner portions of a workpiece, detects a workpiece position based on the two mark positions that are read, uses the detected workpiece position to perform a position correction, and subsequently performs a handling task of a workpiece.

In one type of mobile robot, an arm that transfers a workpiece on a stand is mounted to the mobile robot. This type of mobile robot transfers the workpiece by being automatically positioned at the stand vicinity, but there are cases where the stop position of the mobile robot fluctuates. It is therefore difficult to position the arm accurately with respect to the workpiece using only teaching position information.

Furthermore, as the workpiece size increases, the length of the arm performing a task on the workpiece also must be long, and it is more difficult to accurately position the arm with respect to the workpiece. This is because the effects of the orientation control of the mobile robot are greatly reflected in the positional misalignment of the arm. Accordingly, highly-accurate orientation control is necessary. Because it is necessary to correct the misalignment amount in the three axes of an X-axis, a Y-axis, and a Θ-axis, it is necessary for the mobile robot to include a multi-axis arm. In such a case, it is necessary to increase the accuracy of the control of the multi-axis arm, and to accurately position the arm with respect to the workpiece. Thus, the cost of manufacturing a mobile robot system has been high because it is difficult to accurately position the arm of the mobile robot with respect to the workpiece placed on the stand.

BRIEF DESCRIPTION OF THE DRAWINGS

FIG. 11 shows an example of a side surface of an omniwheel according to the first embodiment;

FIG. 12 shows an example of a front surface of the omniwheel according to the first embodiment;

FIG. 13 shows an example of a state in which a guide roller according to the first embodiment is received in a guide;

DETAILED DESCRIPTION

According to an embodiment, a mobile robot system includes a placement platform, and a mobile robot configured to transfer a workpiece placed at a prescribed position of the placement platform. The placement platform includes a guide including an opening part having an opening greater than a prescribed width, and a body part having the prescribed width. The mobile robot includes an arm part configured to transfer the workpiece placed at the prescribed position of the placement platform, two or more rotatable rollers that have mutually-parallel rotation axes and are arranged along one straight line along a direction crossing an extension direction of the rotation axes, a moving part that is movable omni-directionally, and a controller configured to drive a drive part to move the mobile robot so that at least two rollers among the two or more rollers are received inside the body part of the guide. The guide is positioned so that the arm part can transfer the workpiece placed at the prescribed position of the placement platform when the at least two rollers are received in the body part.

Embodiments of the invention will now be described with reference to the drawings.

The drawings are schematic or conceptual; and the relationships between the thickness and width of portions, the proportions of sizes among portions, etc., are not necessarily the same as the actual values. The dimensions and proportions may be illustrated differently among drawings, even when the same portion is illustrated.

First Embodiment

Figure 1:
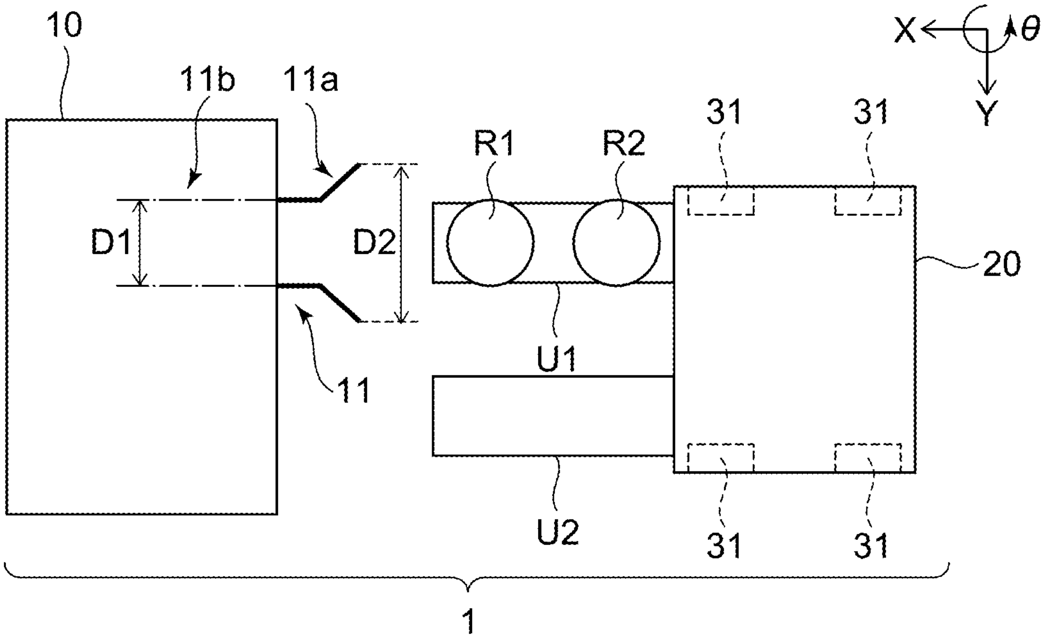
FIG. 1 is a schematic view showing an example of a schematic configuration of a mobile robot system according to a first embodiment.

FIG. 1 is a schematic view showing an example of a schematic configuration of a mobile robot system 1. According to the embodiment as shown in FIG. 1, the mobile robot system 1 includes a stand 10 including a placement platform, and a mobile robot 20. The stand 10 is a platform on which a workpiece W (described below) is placed. The mobile robot 20 picks up the workpiece W placed on the stand 10, and places the workpiece W on another stand 10. Also, the mobile robot 20 picks up the workpiece W on the other stand 10, transports the workpiece W, and places the workpiece W on the stand 10. The stand 10 includes a guide 11 that has a width D1 and an opening having a width D2 (>D1). The mobile robot 20 includes two rectangular parallelepiped-shaped units U1 and U2 at the travel-direction side. According to the embodiment, the direction in which the mobile robot 20 travels with respect to the stand 10 is taken as an X-axis; a direction perpendicular to the X-axis is taken as a Y-axis; and the orientation (the angle) of the travel direction of the mobile robot is taken as a theta (Θ) direction. The direction perpendicular to the page surface of the illustration, i.e., the height direction, is taken as a Z-axis. The stand 10 and the mobile robot 20 will now be described in detail. Although a configuration including two guide rollers R1 and R2 is shown in FIG. 1, the guide rollers are not limited to two; three or more may be arranged with the centers along one straight line. More detailed specific examples of the stand 10 and the mobile robot 20 of the mobile robot system 1 will now be described.

Figure 2:
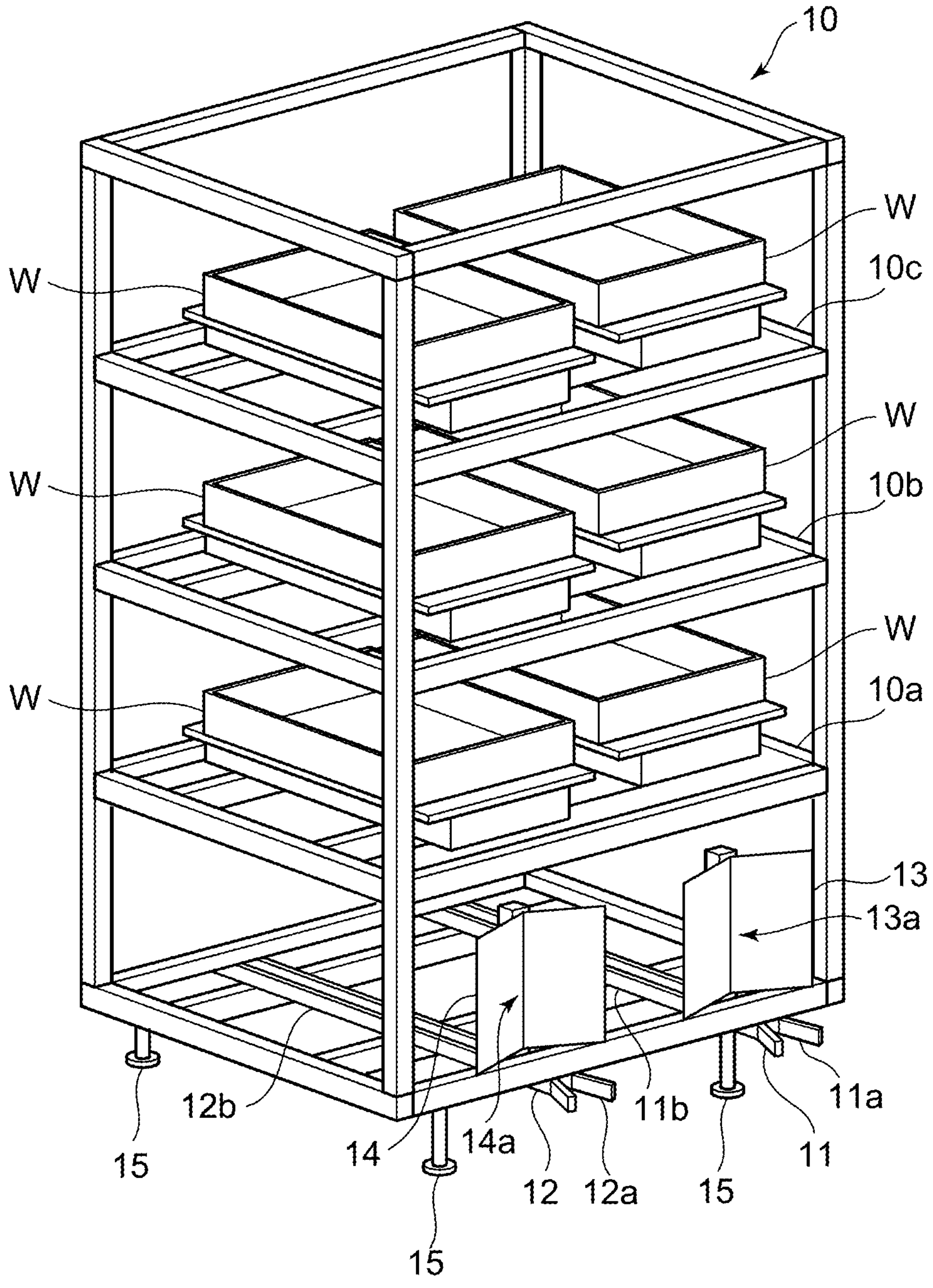
FIG. 2 is a perspective view showing an example of the appearance of a stand according to the first embodiment.

FIG. 2 is a perspective view showing an example of the appearance of the stand 10. According to the embodiment, four levels are provided in the rectangular parallelepiped-shaped framework of the stand 10. Placement platforms 10*a*, 10*b*, and 10*c* of the three upper levels are placement platforms on which the workpieces W are placed. On each of the placement platforms 10*a*, 10*b*, and 10*c*, platforms on which the workpieces W are placed are laterally arranged; and two workpieces W can be placed. The platforms are located at the same position in the height direction of the stand 10 in each of the placement platforms 10*a*, 10*b*, and 10*c*. Although the stand 10 that includes multiple placement platforms is described in the embodiment, one placement platform may be provided instead of the stand 10. In other words, the stand 10 is an example of a placement platform. FIG. 2 shows a state in which the workpieces W are placed on each platform of each of the placement platforms 10*a*, 10*b*, and 10*c*. Positioning members 13 and 14 are located at the fourth level from the upper side, that is, the lowermost level. The positioning members 13 and 14 are used to appropriately position the mobile robot 20 with respect to the stand 10 when the mobile robot 20 transfers the workpiece W to or from the stand 10. Accordingly, according to the embodiment, two positioning members 13 and 14 are provided to correspond to the platforms of the placement platforms 10*a*, 10*b*, and 10*c*. The positioning members 13 and 14 are formed of rectangular plates bent at the centers. The cross sections of the positioning members 13 and 14 have reverse V-shapes. Marks (positioning parts) 13*a* and 14*a* are provided in the positioning members 13 and 14. According to the embodiment, the marks 13*a* and 14*a* are linear portions extending in the Z-axis direction at the bottoms of the reverse V-shapes. Four legs 15 that support the stand 10 are located at the lower side of the stand 10. Therefore, a prescribed space between the installation surface (e.g., the floor surface) is located at the lower surface of the stand 10. Two guides, i.e., the guide 11 and a guide 12, are arranged along the transverse direction of the stand 10 at the lower side of the stand 10. The opening of the guide 11 is located at the side facing the mobile robot 20. The guides 11 and 12 are located at positions such that the arm part of the mobile robot 20 (described below) can transfer the workpieces W placed on the platforms of the placement platforms 10*a*, 10*b*, and 10*c* of the stand 10 when the two or more guide rollers R1 to R6 (described below) of the mobile robot 20 are received inside the guide 11.

Figure 3:
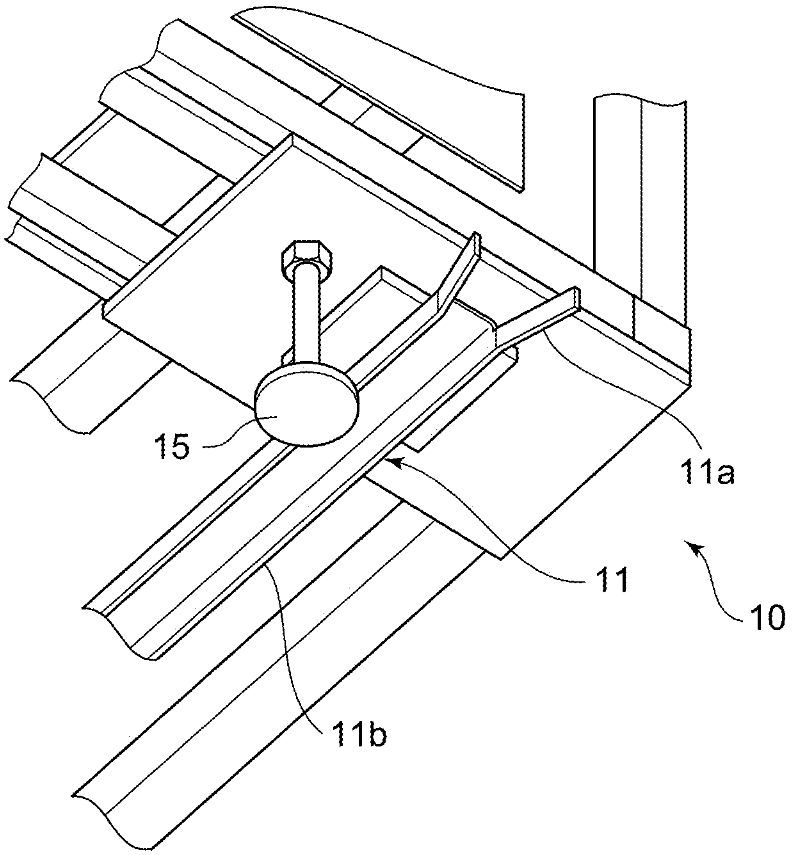
FIG. 3 shows an example of a portion of a guide according to the first embodiment.

FIG. 3 shows an example of a portion of the guide 11. FIG. 3 shows a portion of the bottom side of the stand 10 shown in FIG. 2. As shown in FIG. 3, the guide 11 includes an opening part 11*a* and a body part 11*b*, and is adhered to the lower side of the stand 10. The width of the opening of the opening part 11*a* is the width D2 (>D1); and the width of the opening narrows little by little from the width D2 to the width D1. The body part 11*b* has the width D1 and extends a prescribed length in the transverse direction of the stand 10. According to the embodiment, the prescribed length is a length such that all of the two or more guide rollers can be received when the mobile robot 20 is positioned to transfer the workpiece W to the stand 10. Although not illustrated, the guide 12 also has a configuration similar to that of the guide 11, is located at the lower side of the stand 10, and is adhered at a position such that the workpieces W placed on the other platforms of the placement platforms 10*a*, 10*b*, and 10*c* of the stand 10 can be transferred when the two or more guide rollers R1 to R6 described below are received inside the guide 12.

Figure 4:
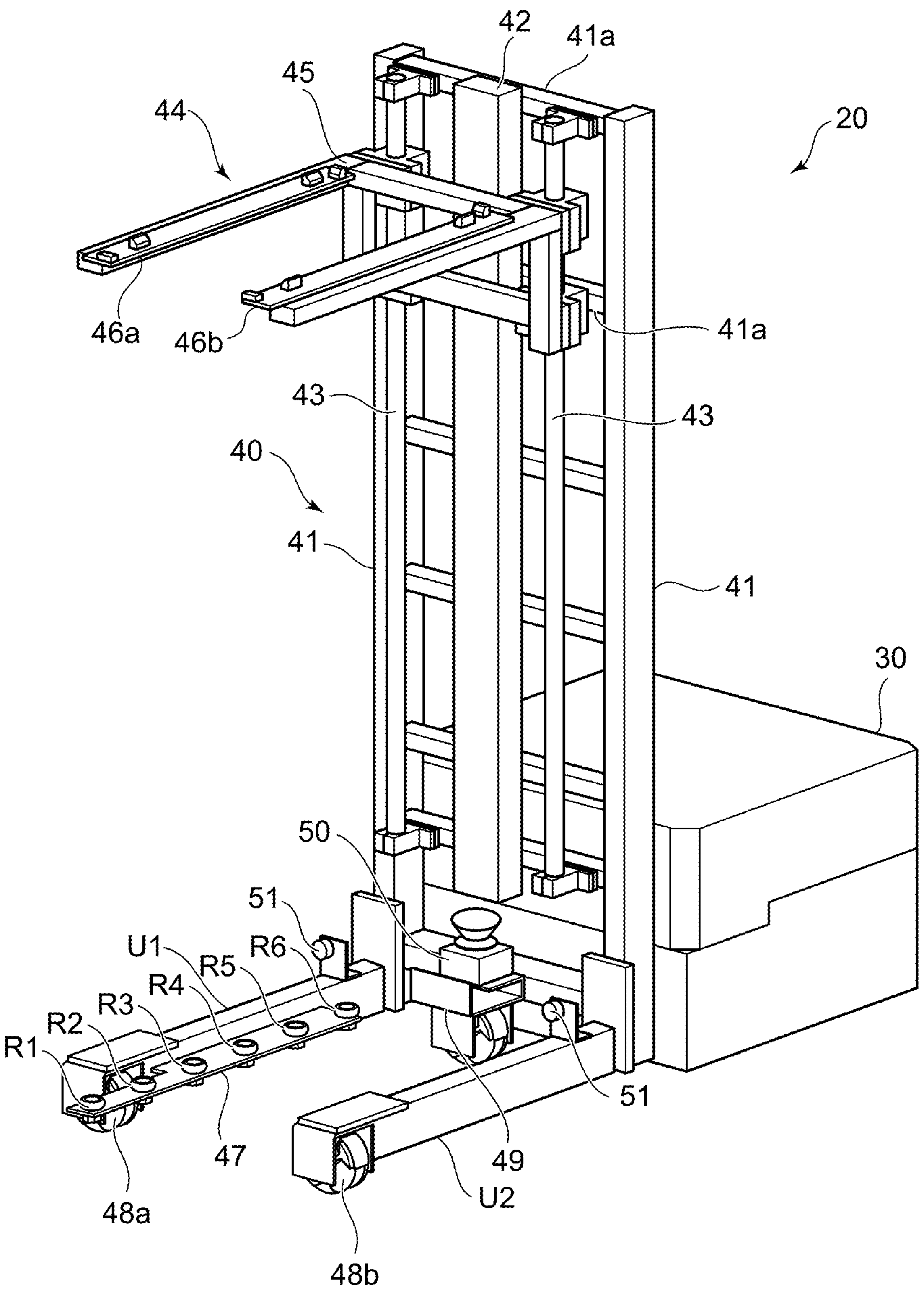
FIG. 4 is a perspective view showing an example of the appearance of the mobile robot according to the first embodiment.

FIG. 4 is a perspective view showing an example of the appearance of the mobile robot 20. According to the embodiment, the mobile robot 20 includes a mobile robot main body 30 and a tool part 40. The mobile robot main body 30 may be configured as one piece with the tool part 40, or may be connected with the tool part 40. That is, it is sufficient for the mobile robot main body 30 and the tool part 40 to be operable as one piece. The mobile robot main body 30 is a robot that is substantially box-shaped, includes a drive part at the lower side, and allows the mobile robot 20 to be movable omni-directionally by the driving of the drive part. Details of the drive part are described below.

Figure 5:
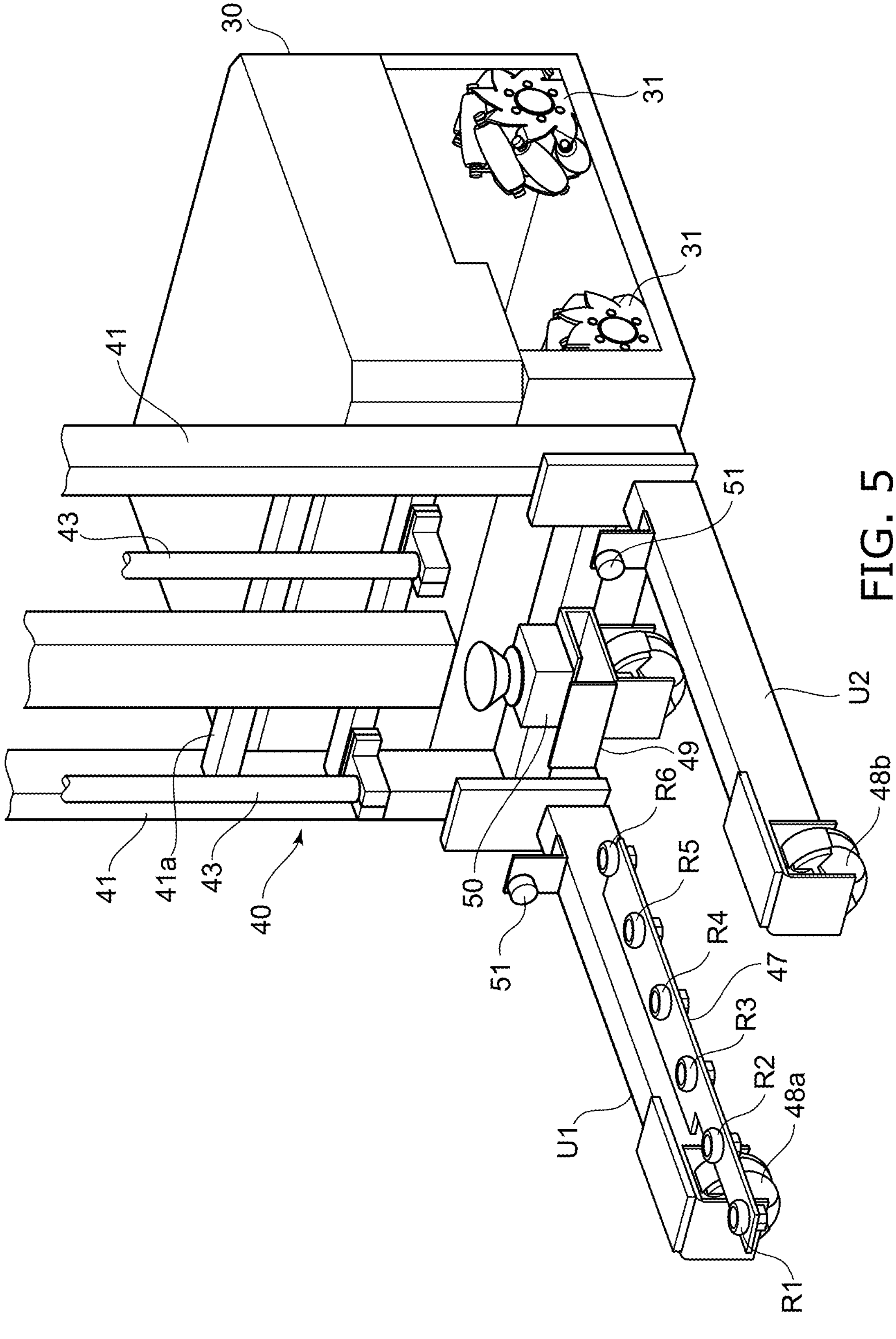
FIG. 5 is a drawing for describing an example of the arrangement of mecanum wheels according to the first embodiment.
Figure 6:
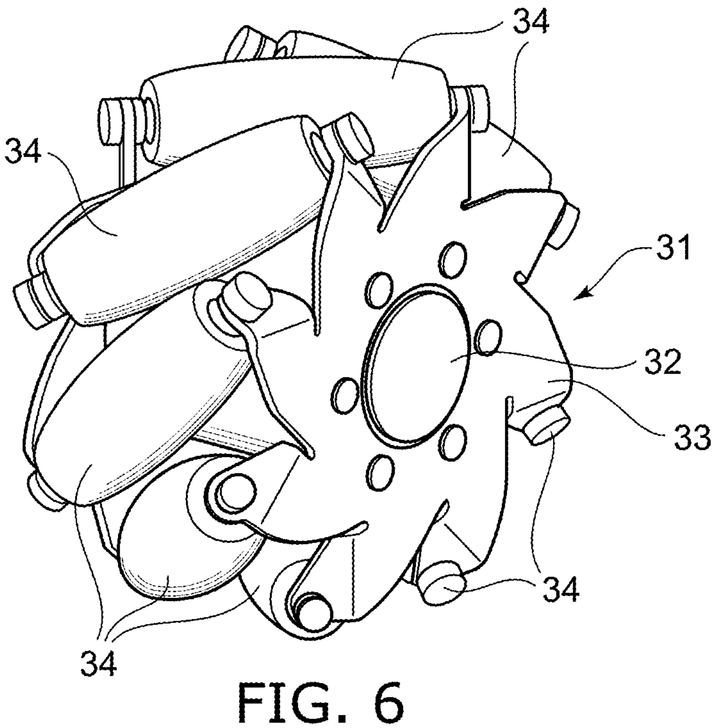
FIG. 6 is a perspective view showing an example of the appearance of the mecanum wheel according to the first embodiment.
Figure 7:
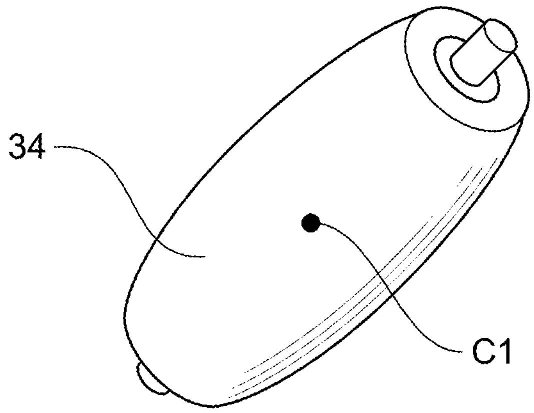
FIG. 7 shows an example of a contact point of the mecanum wheel according to the first embodiment with an installation surface.
Figure 8A:
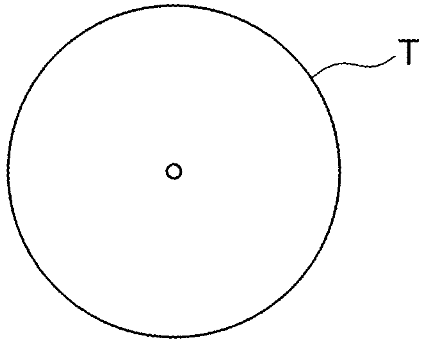
FIGS. 8A and 8B show an example of the relationship between a general wheel and the installation surface.
Figure 8B:
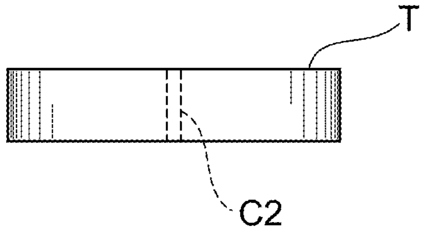

The configuration that allows the mobile robot 20 to move omni-directionally will now be described. According to the embodiment, the mobile robot 20 is movable omni-directionally by arranging mecanum wheels as the drive part at four corners at the lower side of the mobile robot main body 30. FIG. 5 is a drawing for describing an example of the arrangement of the mecanum wheels. As shown in FIG. 5, two mecanum wheels 31 are located at the lower part of one side surface side of the mobile robot main body 30. Although not illustrated, two mecanum wheels 31 are located at the lower part of the opposite side surface side. That is, a total of four mecanum wheels 31 are included. More specifically, the mecanum wheels 31 include right wheels and left wheels. Two right wheels are arranged along one diagonal; and two left wheels are arranged along the other diagonal. The four mecanum wheels 31 may be generally referred to as the drive part hereinbelow. FIG. 6 is a perspective view showing an example of the appearance of the mecanum wheel 31. As shown in FIG. 6, the mecanum wheel 31 includes an axle 32; and a main outer disk 33 is rotatably mounted to the axle 32. Eight barrel rollers 34 are mounted on the main outer disk 33. The extension directions of the rotation axes of the rollers 34 are different from each other, and are tilted 45 degrees with respect to the extension direction of the rotation axis of the axle 32. Thus, because the wheel includes eight barrel rollers, the contact of the mecanum wheel 31 with the installation surface is a contact point C1 as shown in FIG. 7. The contact point C1 is positioned at a bulging portion of the barrel roller. Thus, because the contact with installation surface is provided by only the contact points C1, the four mecanum wheels 31 can travel forward and backward like general wheels by transmitting a drive force, and can turn and move laterally by controlling the drive system. Here, FIGS. 8A and 8B show an example of the relationship between the installation surface and a general wheel T. As shown in FIG. 8A, the cross section of the general wheel T is a donut-shaped cylinder. Therefore, as shown in FIG. 8B, the contact of the wheel T with the installation surface has a linear shape C2. Thus, because the contact with installation surface has the linear shape C2, a turning operation is not easy. In contrast, the mobile robot main body 30 uses the four mecanum wheels 31, and is therefore movable omni-directionally, which is not easy when the general wheel T is used. However, compared to when the general wheel T is used, the mobile robot main body 30 tends to slip with respect to the installation surface, and a following motion occurs easily. According to the embodiment, "following motion" refers to the wheels slipping, the mobile robot 20 tending to shake and slip, and the control being difficult because the contact point of the mecanum wheel 31 with the installation surface is the contact point C1.

Returning now to FIG. 4, the tool part 40 will be described. The tool part 40 includes arm part posts 41, an electric Z-axis (electric part) 42, Z-axis guides 43, an arm part 44, the units U1 and U2, a roller base 47, the guide rollers R1 to R6, a contact sensor (a first sensor) 49, a laser rangefinder (a detecting part) 50, and stoppers 51. The arm part posts 41 are two posts upright in the Z-axis direction with a prescribed spacing interposed. The two arm part posts 41 are connected by multiple rod-shaped members 41*a*. The mobile robot main body 30 is adhered to the lower side of one surface formed of the arm part posts 41 and the rod-shaped members 41*a*. The height of the arm part post 41 is determined according to the height of the placement platform 10*c* on which the workpieces W are placed.

The electric Z-axis 42 is mounted to another surface formed of the arm part posts 41 and the rod-shaped members 41*a*. The cross section of the electric Z-axis 42 has a rectangular rod shape. The arm part 44 is mounted to the electric Z-axis 42. The electric Z-axis 42 includes a motor (not illustrated); and the arm part 44 can be moved in the Z-axis direction along the electric Z-axis 42 by rotationally driving the motor. According to the embodiment, the Z-axis guides 43 extend along the Z-axis. As a result, the movement of the arm part 44 can be guided when the arm part 44 operates along the electric Z-axis 42 in the Z-axis direction.

The arm part 44 includes an arm part supporter 45, a first arm 46*a*, and a second arm 46*b*. The arm part supporter 45 is mounted to the electric Z-axis 42. The first arm 46*a* is mounted to one end of the arm part supporter 45; and the second arm 46*b* is mounted to the other end of the arm part supporter 45. The arm part supporter 45, the first arm 46*a*, and the second arm 46*b* may be formed as one piece. The spacing between the first arm 46*a* and the second arm 46*b* is defined based on the width in the Y-axis direction of the workpiece W to be transferred. The first arm 46*a* and the second arm 46*b* each are configured to extend from the arm part supporter 45 to be parallel to the installation surface on which the mobile robot system 1 is disposed.

Figure 9:
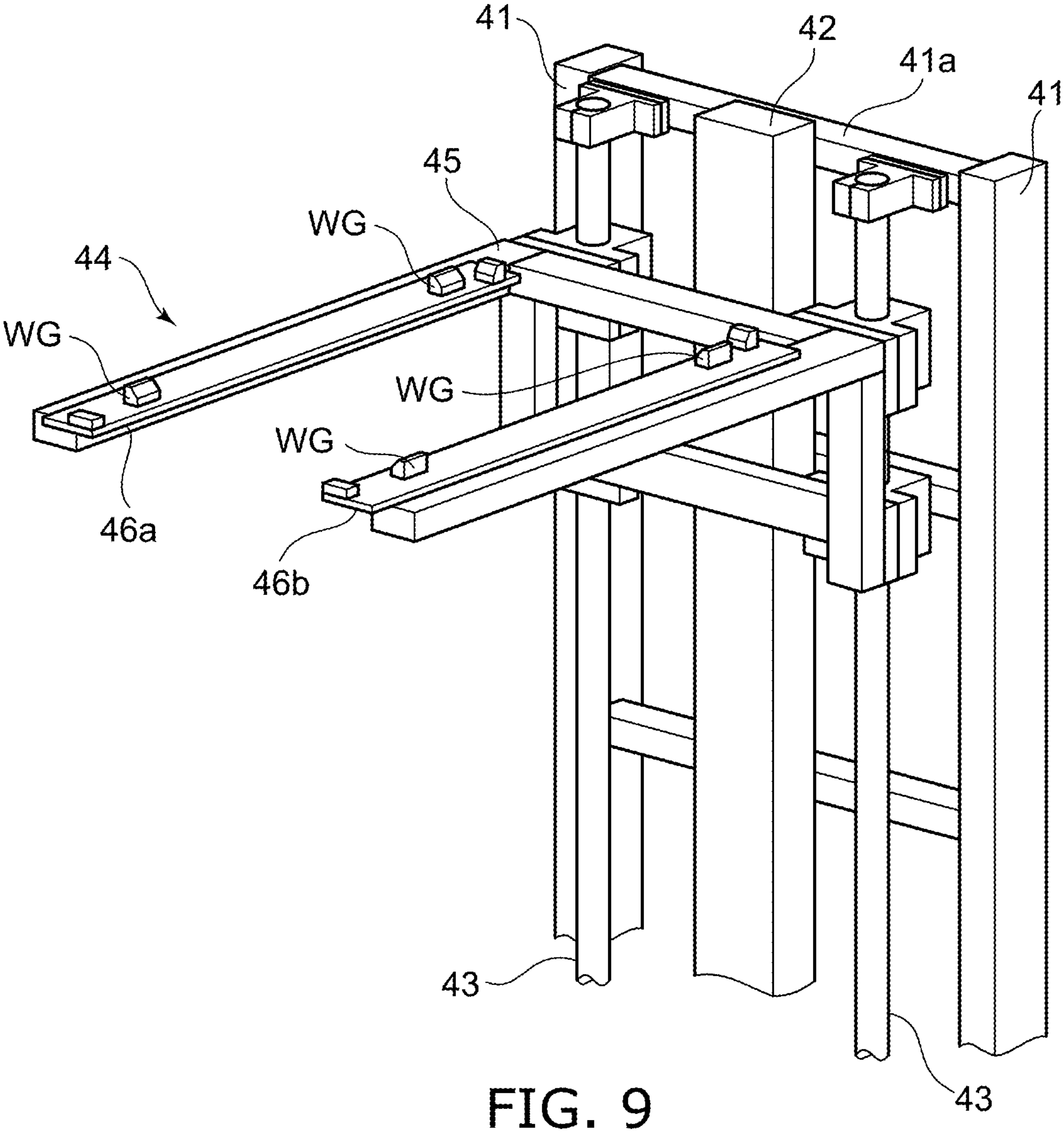
FIG. 9 shows an example of an arm part according to the first embodiment when viewed from the upper side.
Figure 10:
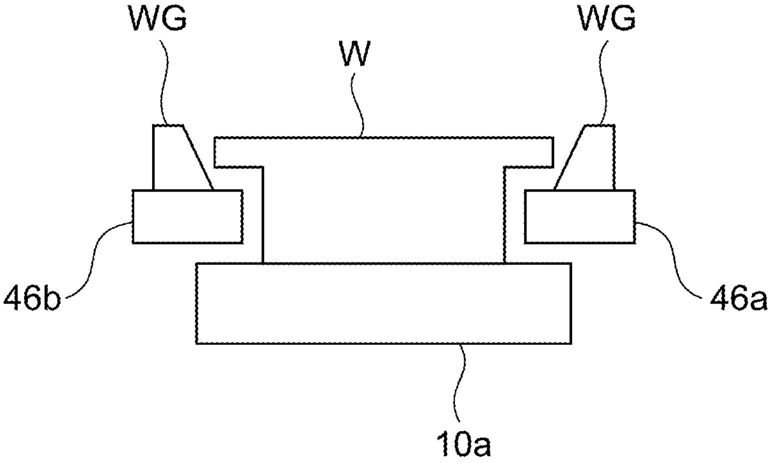
FIG. 10 is a schematic view of a cross section showing an example of an operation of picking up a workpiece according to the first embodiment.

FIG. 9 shows an example of the arm part 44 when viewed from the upper side. As shown in FIG. 9, workpiece guides WG are located at the arm part supporter 45 vicinities of the first and second arms 46*a* and 46*b* and at distal end portion vicinities of the first and second arms 46*a* and 46*b*. The workpiece guides WG are used when transferring the workpiece W. FIG. 10 is a schematic view of a cross section showing an example of an operation of picking up the workpiece W. As shown in FIG. 10, the workpiece W to be placed on the placement platform 10*a* includes protrusions at the left and right upper end portions that protrude in the Y-axis direction. The cross section of the workpiece guide WG is a quadrilateral shape configured so that an oblique side is at the inner side of the arm part 44. When picking up the workpiece W, oblique side portions of the workpiece guides WG of the arm part 44 are inserted below the protrusions of the workpiece W placed on the placement part 10*a*; by moving the arm part 44 upward in the Z-axis direction in this state, the oblique side portions of the arm part 44 abut the lower sides of the protrusions of the workpiece W; and the workpiece W is picked up from the placement platform 10*a*. Accordingly, if the first arm 46*a* and the second arm 46*b* do not penetrate to the appropriate positions with respect to the lateral direction of the workpiece W, the positional relationship between the workpiece guides WG and the protrusions of the workpiece W becomes misaligned; and the workpiece W can no longer be picked up.

The first unit U1 and the second unit U2 extend a prescribed length along the installation surface at two ends of the arm part post 41 at the lower side. The first unit U1 and the second unit U2 are configured so that the mobile robot 20 does not lose balance when the arm part 44 transfers the workpiece W. Wheels are located at the lower sides of the distal ends of the first and second units U1 and U2. According to the embodiment, the wheels are omniwheels. FIGS. 11 and 12 show an example of an omniwheel 48*a*. FIG. 11 shows an example of the side surface of the omniwheel 48*a*. FIG. 12 shows an example of the front surface of the omniwheel 48*a*. In FIGS. 11 and 12, G indicates the contact surface. As shown in FIGS. 11 and 12, the omniwheel 48*a* can move freely in the longitudinal direction and the lateral direction due to a main rotation of the main part and the passive rotation of rollers located on the main outer disk. Accordingly, the tool part 40 operates by following the driving of the mecanum wheels 31 of the mobile robot main body 30. As a result, the mobile robot 20 can turn and move laterally as described above, even when the tool part 40 is included.

The roller base 47 is located at the first unit U1. The roller base 47 is a plate-like member. According to the embodiment, the roller base 47 is located at the second unit U2 side of the first unit U1 and extends along the longitudinal direction of the first unit U1. At least two passively rotatable guide rollers are arranged at the roller base 47 so that the centers of the guide rollers are along one straight line along the longitudinal direction. According to the embodiment as shown in FIG. 4, six guide rollers R1 to R6 are arranged so that the rotation axes of the guide rollers R1 to R6 are parallel to each other; and the guide rollers R1 to R6 are arranged along one straight line along a direction crossing the extension direction of the rotation axes. The diameters of the guide rollers R1 to R6 are less than the width D1 of the body part 11*b* of the guide 11 described above. FIG. 13 shows an example of the state in which the guide rollers R1 to R6 located at the roller base 47 are received in the guide 11. FIG. 13 is a drawing of the lower side of the stand 10 when viewed from the side opposite to the side at which the mobile robot 20 is positioned. A state is shown in which the guide roller R1 located at the roller base 47 is received inside the body part 11*b* of the guide 11.

The contact sensor 49 and the laser rangefinder 50 are located at the lower side of the arm part post 41 between the first unit U1 and the second unit U2. The contact sensor 49 detects contact with the stand 10. When the contact with the stand 10 is detected, the driving of the mobile robot main body 30 is stopped. The laser rangefinder 50 irradiates laser pulses in multiple directions, and performs processing such as receiving the reflected waves of the laser pulses, etc. The two stoppers 51 are located respectively at the lower sides of the arm part posts 41. The stoppers 51 regulate the stop position of the mobile robot 20 with respect to the stand 10. The contact sensor 49 is configured to detect the contact with the stand 10 when the mobile robot 20 is positioned at the stop position.

Figure 14:
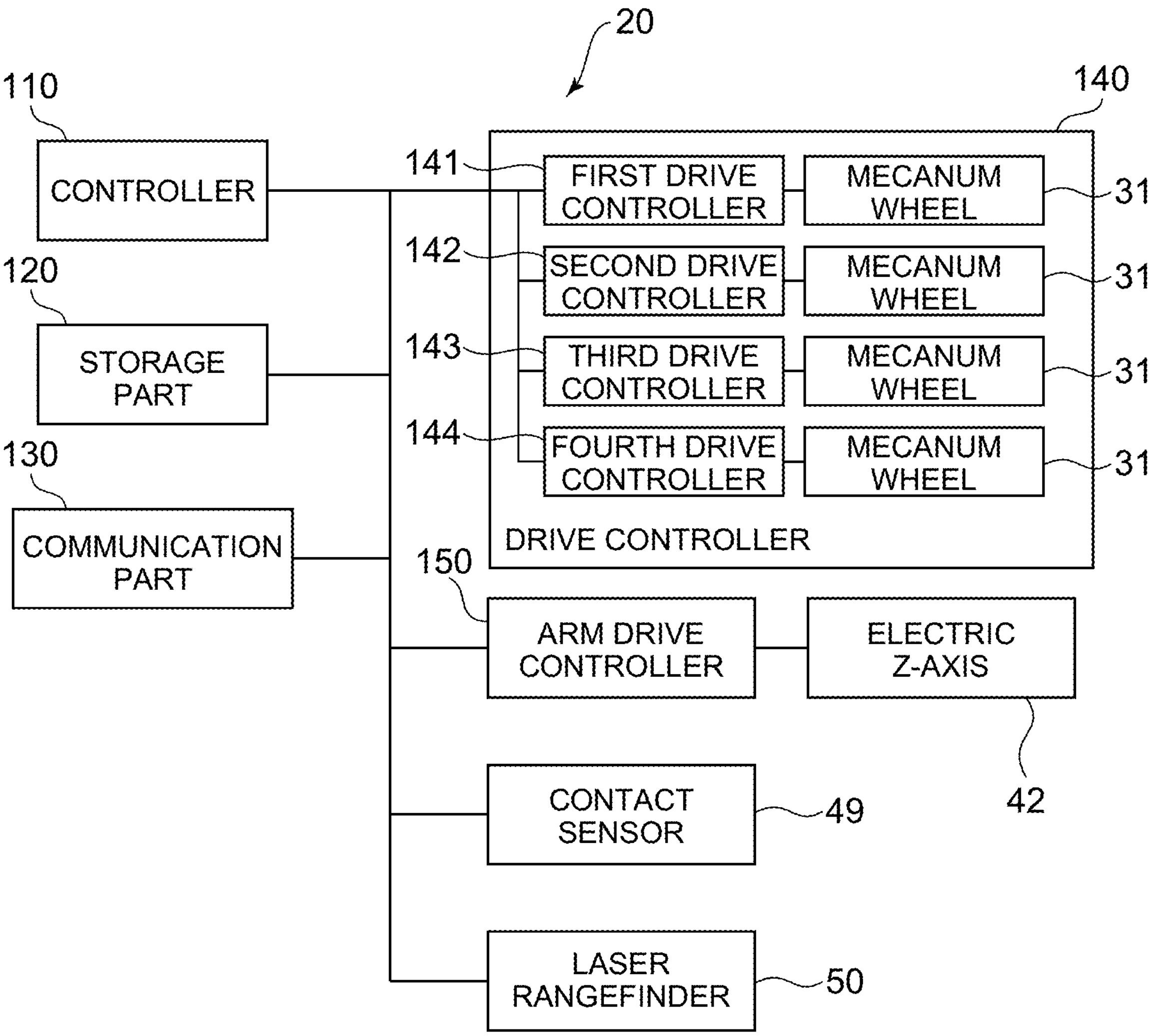
FIG. 14 shows an example of a control configuration of the mobile robot according to the first embodiment.

FIG. 14 shows an example of a control configuration of the mobile robot 20. As shown in FIG. 14, the mobile robot 20 includes a controller 110, a storage part 120, a communication part 130, a drive controller 140, an arm drive controller 150, the contact sensor 49, and the laser rangefinder 50. The drive controller 140 includes a first drive controller 141, a second drive controller 142, a third drive controller 143, and a fourth drive controller 144. The first to fourth drive controllers 141 to 144 are connected respectively with the mecanum wheels 31. The arm drive controller 150 is connected with the electric Z-axis 42.

The controller 110 includes a CPU, ROM, RAM, etc., and controls the transfer processing of the workpiece by the mobile robot 20. The storage part 120 is, for example, a hard disk drive (HDD) or a solid state drive (SSD), and stores various data and/or programs. According to the embodiment, a 2D map that indicates the workspace in which the stand 10 is installed and the structure of the stand 10 (the number of placement platform levels, the positions at which the workpieces W are placed, the mark positions, etc.) are stored as the various data. The programs that are stored include programs related to transfer processing of the workpieces W such as, for example, a program for executing processing when transferring the workpiece W from the prescribed position of the stand 10 to the prescribed position of another stand 10.

The communication part 130 is a wireless communication part, and receives instructions from the outside. For example, the mobile robot 20 starts performing the transfer processing of the workpiece W based on an instruction received via the communication part 130.

The drive controller 140 individually controls the driving of the mecanum wheels 31 described above. As described above, the mecanum wheels 31 are located at the lower side of the four corners of the mobile robot main body 30; and the mecanum wheels 31 are configured to be independently drivable respectively by the first to fourth drive controllers 141 to 144. Accordingly, the mobile robot 20 is movable omni-directionally under the control of the controller 110.

The arm drive controller 150 moves the arm part 44 along the electric Z-axis 42 to a prescribed position in the Z-axis direction by driving a motor (not illustrated) included in the electric Z-axis 42. The contact sensor 49 detects contact with the stand 10. The detection result is transmitted to the controller 110. The laser rangefinder 50 irradiates a laser in pulses in multiple directions, and measures the distance to an object and the two-dimensional shape based on the time to receive the reflected wave. Based on the measurement result thus obtained, the laser rangefinder 50 estimates the position of the mobile robot 20 on the 2D map. The estimation that is based on the measurement result also includes the positions of the marks 13*a* and 14*a* of the positioning members 13 and 14. The estimation result is transmitted to the controller 110 as position information.

Figure 15:
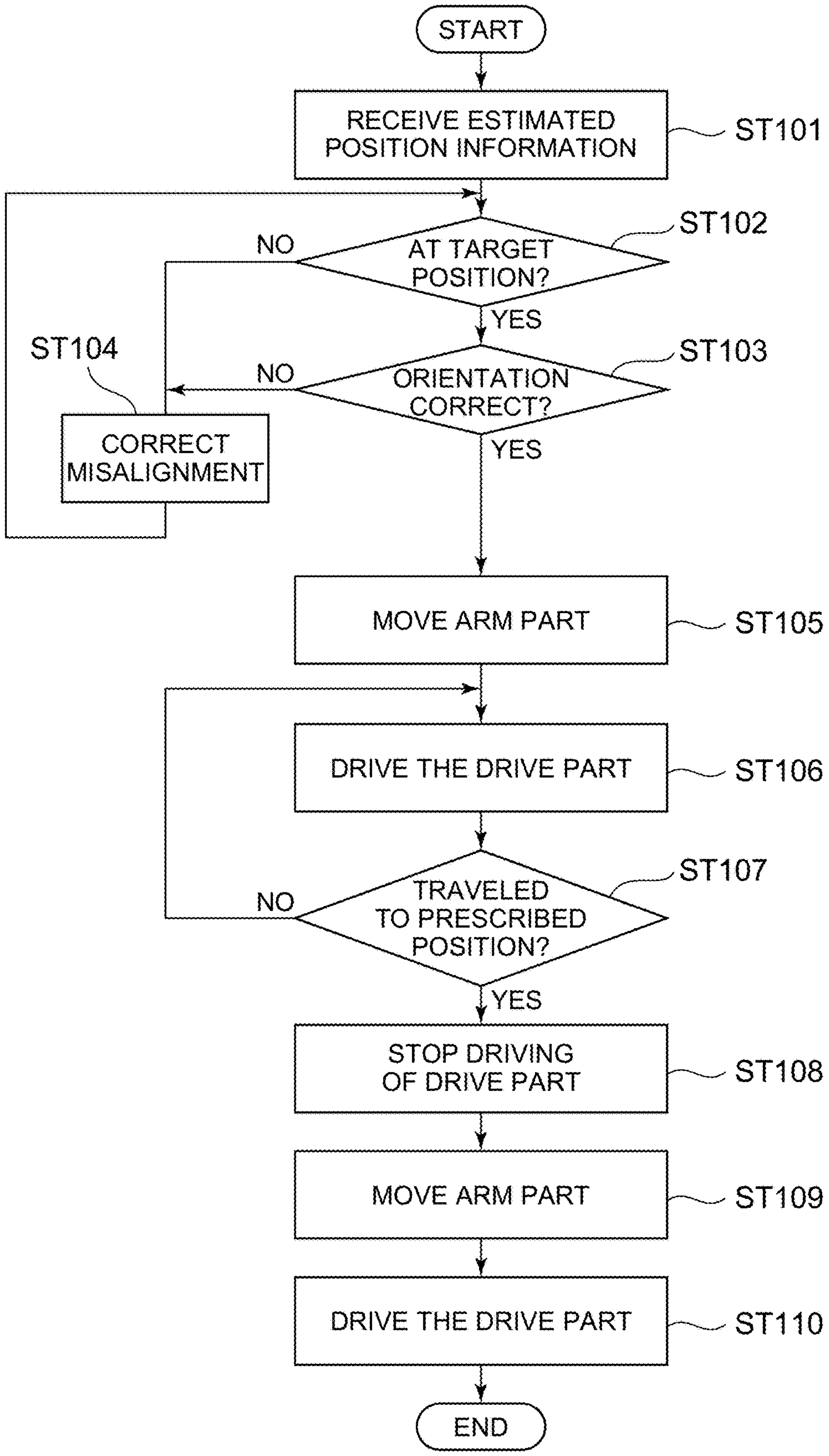
FIG. 15 is a flowchart showing an example of positioning processing according to the first embodiment.

The processing that is performed by the mobile robot system 1 will now be described with reference to FIG. 15. FIG. 15 is a flowchart showing an example of processing of positioning the mobile robot 20 with respect to the workpiece W placed on the stand 10. The processing after the positioning to the vicinity of the target stand 10 from another stand 10 or from an initial position will be described. According to the embodiment, the position that is the target (hereinbelow, called the target position) refers to the mobile robot 20 being a prescribed distance from the end of the stand 10 and an orientation in a direction (the Y-axis direction) perpendicular to the longitudinal direction of the stand 10. In the following processing, the case is described where the mobile robot 20 is positioned by the guide 11 with respect to the workpiece W placed on the placement platform 10*a* of the stand 10.

The mobile robot 20 is positioned at the target position with respect to the stand 10. The movement to the target position is realized by the controller 110 executing a program related to the transfer. The mecanum wheels 31 are driven by the drive controller 140 of the mobile robot main body 30; and the mobile robot 20 is positioned at the target position according to a predetermined path. At this time, the mobile robot 20 is driven by the mecanum wheels 31; therefore, a following motion occurs easily due to the small contact point with the installation surface. Accordingly, when the mobile robot 20 has stopped at the target position, there are cases where positional and orientation misalignment with respect to the target position occur.

After the mobile robot 20 has stopped at the target position, the controller 110 receives estimated position information from the laser rangefinder 50 (ST101).

Then, the controller 110 determines whether or not the current position of the mobile robot 20 is the target position (ST102). According to the embodiment, the controller 110 determines whether or not the estimated position information of the mobile robot 20 and the predesignated position information on the 2D map match by comparing the two positions. As a result, the controller 110 can confirm whether or not the current position is the target position.

When the position is determined to be the target position (ST102: YES), the controller 110 determines whether or not the orientation of the mobile robot 20 is correct (ST103). According to the embodiment, it is determined whether or not the orientation of the mobile robot 20 is in a direction (the Y-axis direction) perpendicular to the longitudinal direction of the stand 10. More specifically, the controller 110 performs the determination based on the estimated position of the mark 13*a* received from the laser rangefinder 50. As a result, the orientation of the mobile robot 20 can be confirmed to be accurate. Although a configuration that uses the laser rangefinder 50 to determine the target position and the orientation is described in the embodiment, the sensor is not limited thereto. For example, a separate sensor for determining the target position and the orientation may be included in the mobile robot 20; and the target position and the orientation may be determined using the detection result of this sensor.

When the controller 110 determines that the positions do not match (ST102: NO), or determines that the orientations do not match (ST103: NO), the controller 110 corrects the misalignment of the mobile robot 20 (ST104). More specifically, the controller 110 controls the drive part controller 140 to correct the positional and orientation misalignments to the target position and orientation. As a result, the mobile robot 20 is positioned at the target position; and the orientation of the mobile robot 20 is corrected. As a result, for example, the arrangement direction of the guide rollers R1 to R6 is positioned to be included within the range of the opening of the guide 11 located at the stand 10.

When the mobile robot 20 is determined to be accurately positioned at the target position (ST103: YES), or when the misalignment has been corrected (ST104), the controller 110 controls the arm drive controller 150 to move the arm part 44 to the prescribed position in the Z-axis direction matching the height at which the workpiece W is to be placed (ST105). To pick up the workpiece W placed on the placement platform 10*a* of the first level of the stand 10, the arm part 44 is moved to a height such that the oblique side portions of the workpiece guides WG of the first arm 46*a* and the oblique side portions of the workpiece guides WG of the second arm 46*b* are positioned at the lower sides of the protrusions of the workpiece W. Then, the controller 110 drives the drive part (the four mecanum wheels 31) (ST106). Specifically, the controller 110 causes the mobile robot 20 to travel toward the stand 10.

Figure 16:
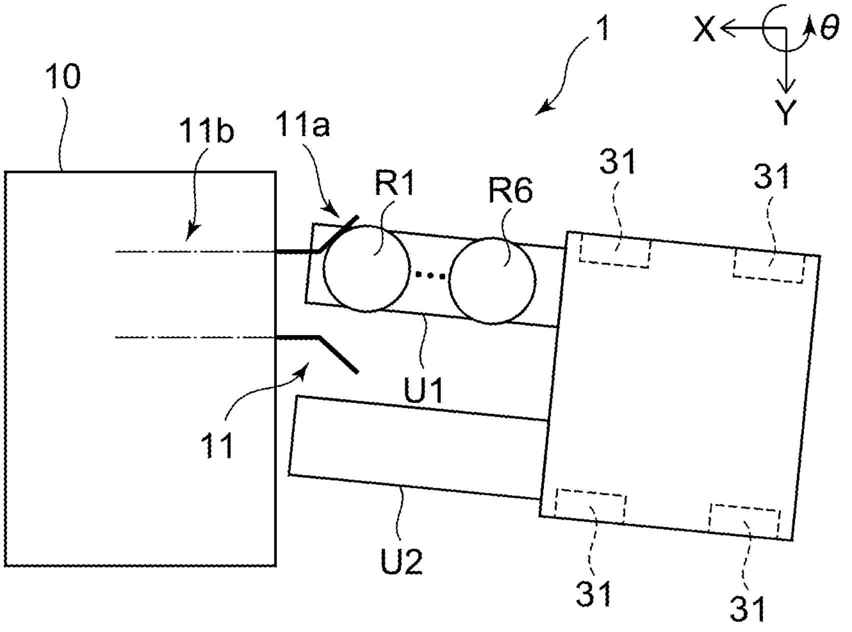
FIG. 16 is a schematic view showing an example of an operation according to the first embodiment.
Figure 17:
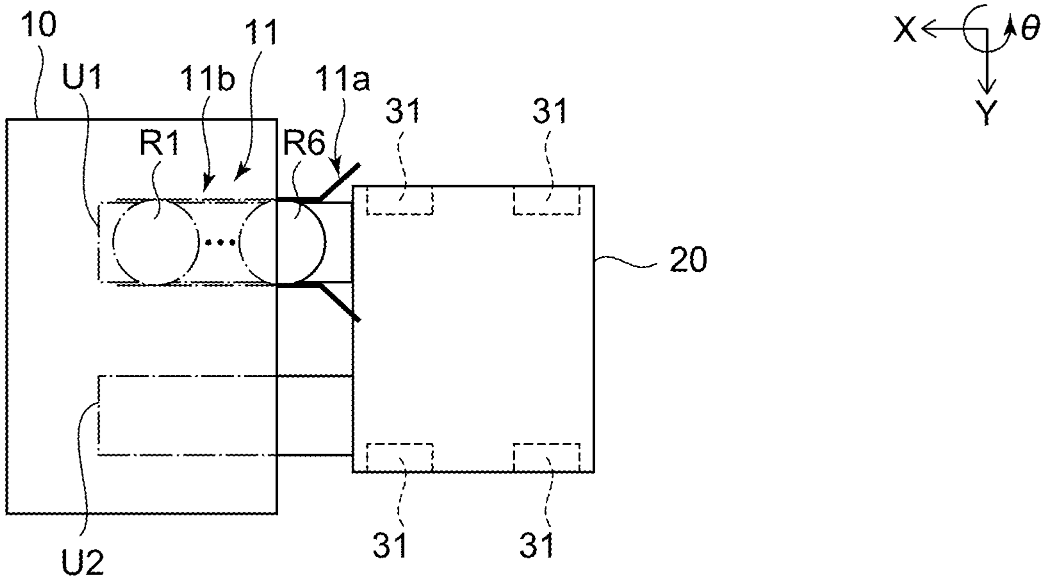
FIG. 17 is a schematic view showing an example of the operation according to the first embodiment.

As a result, the mobile robot 20 approaches the side surface of the stand 10. At this time, even if the mobile robot 20 has positional misalignment and/or tilt with respect to the stand 10, as long as the guide roller R1 is positioned within the range of the width D2, the guide roller R1 at the distal end of the roller base 47 abuts the inner side of the opening of the guide 11 as schematically shown in FIG. 16 when the mobile robot 20 travels. Then, as the guide roller R1 starts to rotate while being regulated by the inner side of the opening part 11*a* and the travel of the mobile robot 20 continues, the guide roller R1 moves along the inner side of the opening part 11*a* and is received in the body part 11*b* of the guide 11. Then, the second guide roller R2 abuts the inner side of the opening of the guide 11, and similarly to the first guide roller R1, is received in the body part 11*b* of the guide 11. Thus, as schematically shown in FIG. 17, the multiple guide rollers R1 to R6 located at the roller base 47 are received in the body part 11*b* of the guide 11. That is, in the process of the guide rollers R1 to R6 being sequentially received in the body part 11*b*, the travel direction of the mobile robot main body 30 is regulated to be along the X-axis direction, causing the Θ-direction which indicates the orientation of the mobile robot main body 30 to be along the X-axis direction. As a result, when approaching the stand 10, even when misalignment from the target position occurs due to a following motion, the mobile robot main body 30 can travel toward the target position and direction. Although an example is described in the embodiment in which all of the multiple guide rollers R1 to R6 are received in the body part 11*b*, it is sufficient for two or more guide rollers to be received in the body part 11*b*.

Then, the controller 110 determines whether or not the mobile robot 20 has traveled to the prescribed position (ST107). According to the embodiment, the controller 110 determines whether or not the prescribed position has been reached based on a signal transmitted from the contact sensor 49. For example, it is determined that the prescribed position has not been reached when an OFF signal is received from the contact sensor 49; and it is determined that the prescribed position has been reached when an ON signal is received. Here, the prescribed position is a position at which the four workpiece guides WG of the arm part 44 match the protrusions of the workpiece W in the Z-axis direction. When it is determined that the prescribed position has not been reached (ST107: NO), the controller 110 continues the travel operation of the mobile robot 20.

When it is determined that the prescribed position has been reached (ST107: YES), the controller 110 stops the driving of the drive part (ST108). As a result, the mobile robot 20 stops. At this time, the mobile robot 20 is accurately positioned with respect to the stand 10 because the centers of the multiple guide rollers R1 to R6 are arranged along one straight line. In other words, two workpiece guides WG of the first arm 46*a* are positioned at the lower side of the protruding part and at the right side of the workpiece W when viewed from the mobile robot 20; and two workpiece guides WG of the second arm 46*b* are positioned at the lower side of the protruding part and at the left side of the workpiece W when viewed from the mobile robot 20.

Then, the controller 110 controls the arm drive controller 150 to move the arm part 44 upward in (the Z-axis direction) (ST109). The movement amount of the arm part 44 at this time is at least an amount that lifts the workpiece W from the placement platform 10*a*. As a result, the workpiece W is picked up from the placement platform 10*a*. Then, the mobile robot 20 drives the drive part (ST110). Specifically, the controller 110 moves the mobile robot 20 out of the stand 10, and then moves the mobile robot 20 from the current position to the target position at the next stand 10 on which the workpiece W that was picked up is to be placed. Thereafter, the processing is similar to the processing of steps ST101 to ST110 described above, in which the workpiece W is placed instead of being picked up.

In the mobile robot system 1 having such a configuration, the guide 11 or the guide 12 of the stand 10 is positioned so that the arm part 44 can transfer the workpieces W placed on the placement platforms 10*a*, 10*b*, and 10*c* of the stand 10 when the guide rollers R1 to R6 are received in the body part 11*b* of the guide 11 or a body part 12*b* of the guide 12. Accordingly, in the mobile robot system 1, the arm part 44 of the mobile robot 20 can be accurately positioned with respect to the workpiece W placed on the stand 10 by using a simple configuration; and the cost for positioning can be reduced. If the tool part 40 were to include a multi-axis robot arm to correct the misalignment in the three axes of the X-axis direction, the Y-axis direction, and the Θ-direction, the mobile robot system 1 would be expensive; however, according to the embodiment, the misalignment of the three axes can be prevented because the positioning can be performed accurately; therefore, a multi-axis robot arm may not be included.

In the mobile robot system 1, the mecanum wheels 31 are used as the drive part of the mobile robot 20 when the mobile robot 20 travels, for example, along the inner side of the opening of the guide 11; therefore, the contact with the installation surface is reduced, and the travel is smooth and regulated.

Although an example is described in the embodiment above in which six of the guide rollers R1 to R6 are located at the roller base 47, the number of guide rollers is not limited to six; it is sufficient for the configuration to include two or more guide rollers, and for the centers of the two or more guide rollers to be arranged along one straight line. When only two guide rollers are included, it is desirable for the distance between the guide rollers to be defined so that, for example, when the two guide rollers are received in the body part 11*b*, the guide rollers are positioned at the two end portions of the body part 11*b*. Thus, by increasing the distance between the guide rollers, the positioning accuracy of the arm part 44 with respect to the workpiece W placed on the stand 10 can be increased even when two guide rollers are provided.

Second Embodiment

A second embodiment differs from the first embodiment in that a control is performed to adjust the travel direction of the mobile robot inside the guide as the guide rollers travel inside the guide. Accordingly, the control will now be described in detail. The same configurations as those of the first embodiment are marked with the same reference numerals; and a description of these configurations is omitted. To simplify the description in the embodiment, an example is described in which one guide 11 is included in the stand 10; and two guide rollers are included in the unit U1.

Figure 18:
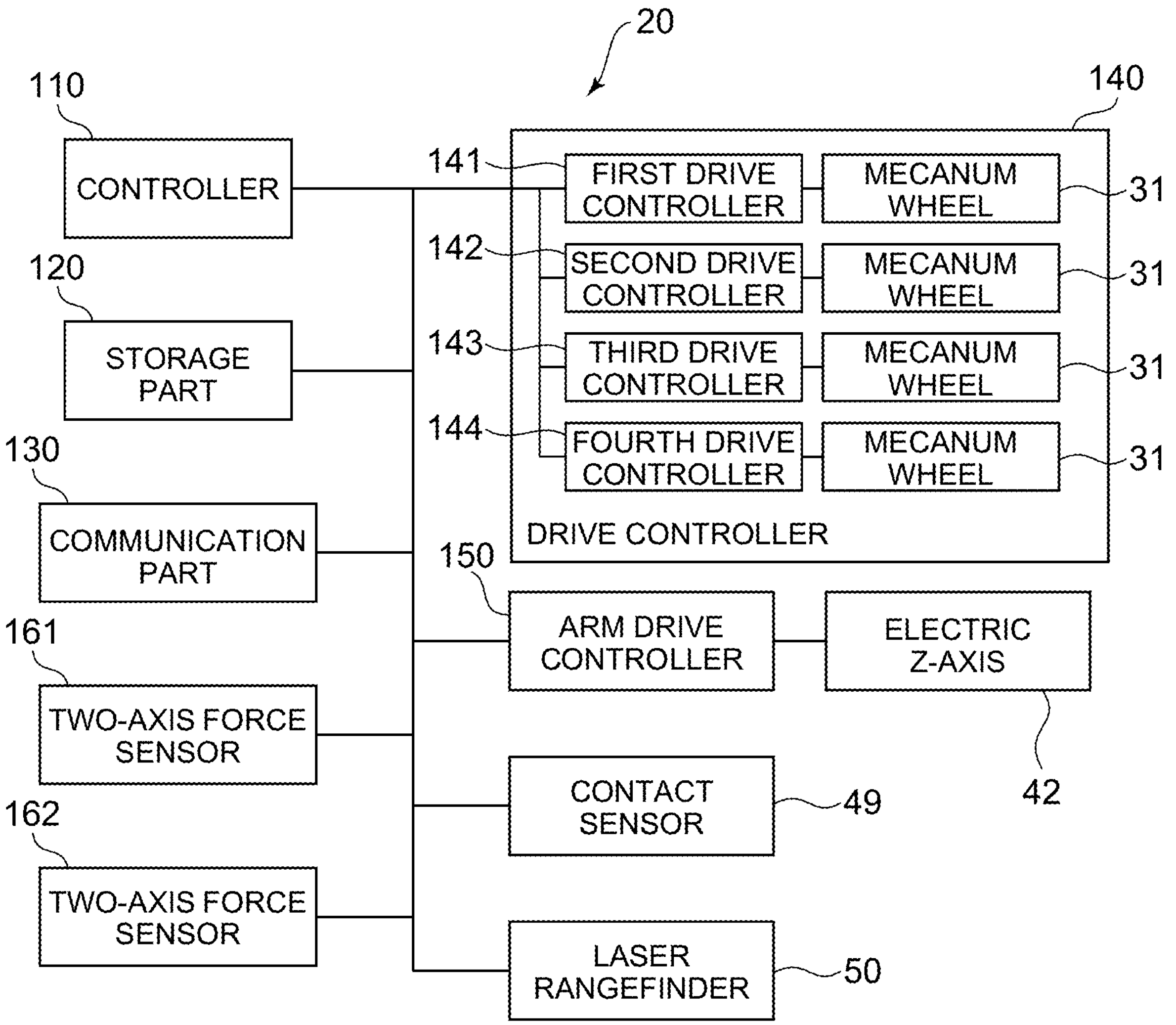
FIG. 18 shows an example of a control configuration of a mobile robot according to a second embodiment.

FIG. 18 shows an example of a control configuration of the mobile robot 20 of the embodiment. As shown in FIG. 18, the mobile robot 20 additionally includes two-axis force sensors (second sensors) 161 and 162 in addition to the configuration of the mobile robot 20 shown in FIG. 14 above. The two-axis force sensor 161 is located at the guide roller R1; and the two-axis force sensor 162 is located at the guide roller R2. The two-axis force sensors 161 and 162 detect forces in the travel direction (the X-axis direction) and the lateral direction (the Y-axis direction). Thus, the forces that are detected in the two axis directions are output to the controller 110. Although an example is described in the embodiment in which the two-axis force sensors 161 and 162 are used, it is sufficient to use a sensor that can detect a force in the Y-axis direction.

Figure 19:
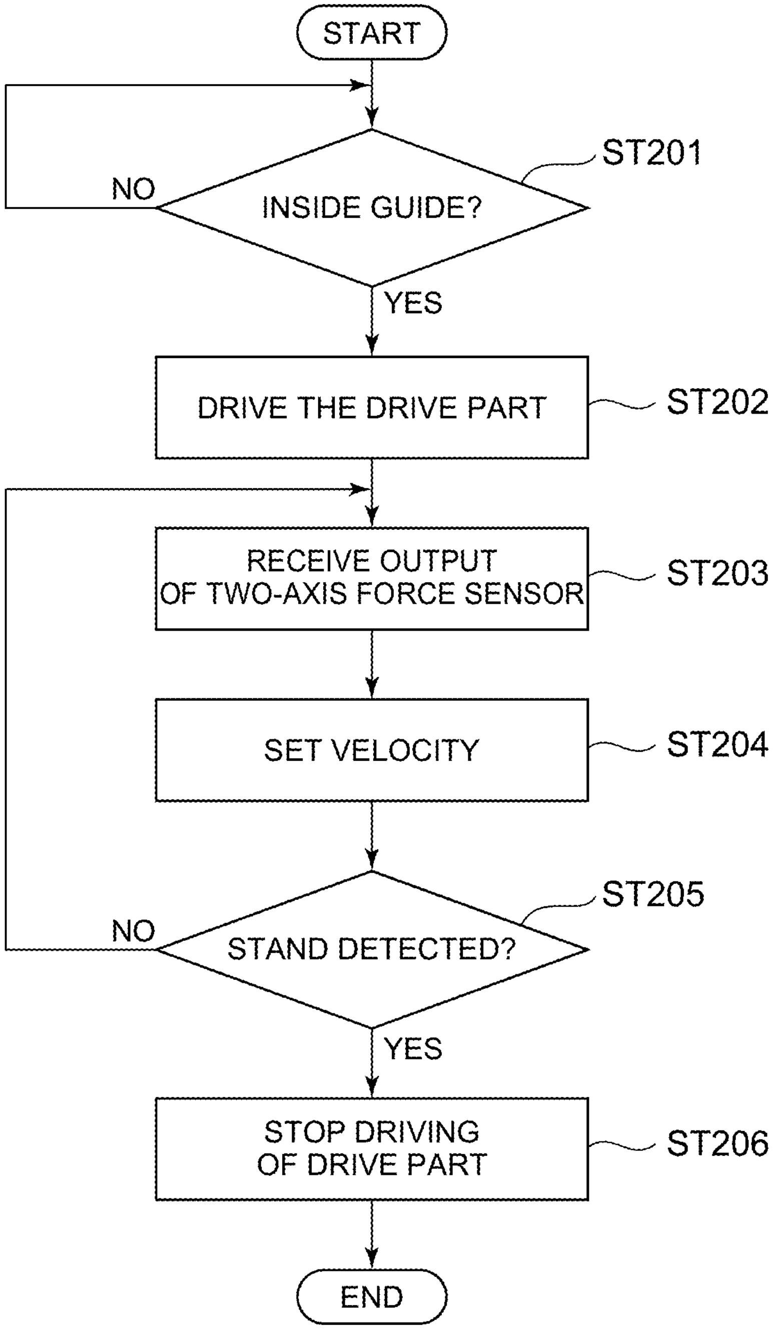
FIG. 19 is a flowchart showing an example of adjustment processing of a travel direction according to the second embodiment.

FIG. 19 is a flowchart showing an example of adjustment processing of the travel direction. As shown in FIG. 19, the controller 110 determines whether or not a guide roller is inside the guide 11 (ST201). For example, it is sufficient for the controller 110 to determine whether or not a guide roller is traveling through the guide 11 based on the distance and time traveled from the target position described above and the estimated position information. When a guide roller is determined to be inside the guide 11 (ST201: YES), the controller 110 performs the following processing. Although an example is described in the embodiment in which it is determined whether or not a guide roller is inside the guide 11, a configuration may be used in which the following processing is performed when an output of a force in the Y-axis direction by the two-axis force sensor 161 or 162 is detected.

Then, the controller 110 drives the drive part (the four mecanum wheels 31) (ST202). As a result, the controller 110 continues the processing of moving the mobile robot 20 in the travel direction at a movement velocity Vx. As the mobile robot 20 travels, the controller 110 receives the outputs from the two two-axis force sensors 161 and 162 (ST203).

Figure 20:
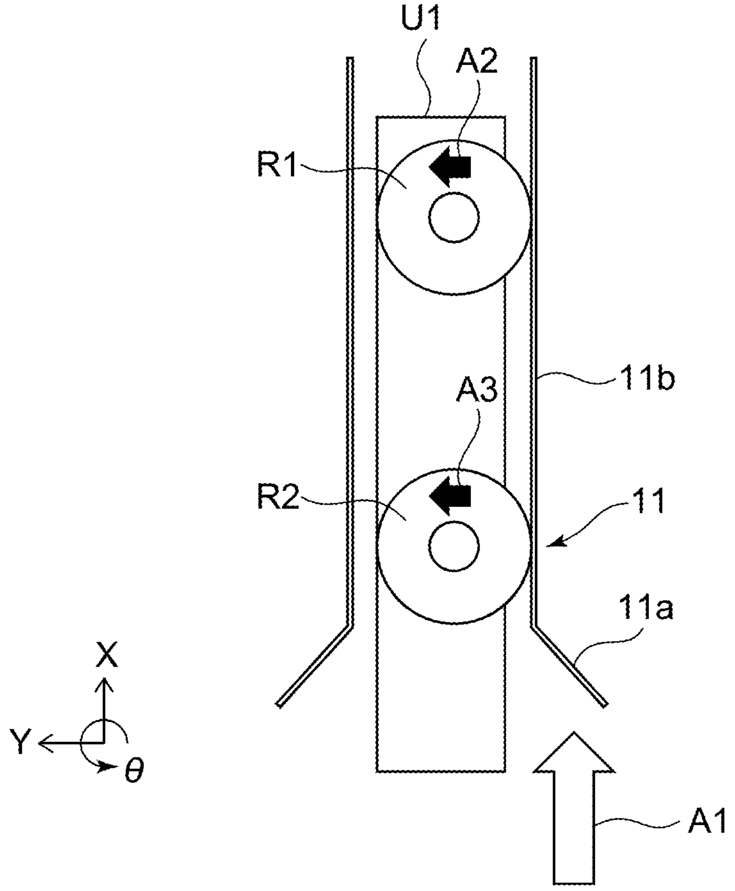
FIG. 20 is a schematic view showing an example of an operation according to the second embodiment.

Then, the controller 110 calculates the Y-axis direction force component based on the received output, and sets the drive velocity of the drive part to include the movement velocity Vx in the X-axis direction and a velocity component calculated to move away from where the Y-axis direction force component is applied (ST204). For example, when the mobile robot 20 is traveling in the X-axis direction as illustrated by arrow A1 in the schematic view of FIG. 20, and when a Y-axis direction force illustrated by arrow A2 (toward the left in the illustration) is applied to the guide roller R1 and a Y-axis direction force illustrated by arrow A3 (toward the left in the illustration) is applied to the guide roller R2, the velocity is set so that the mobile robot 20 travels toward the left side so that the forces are not applied. As a result, the travel direction of the mobile robot 20 is adjusted to move away from where the Y-axis direction force is applied.

Then, the controller 110 determines whether or not the contact sensor 49 has detected the stand 10 (ST205). When the controller 110 determines that the contact sensor 49 has not detected the stand 10 (ST205: NO), the controller 110 performs the processing of steps ST203 and ST204 described above. As a result, the adjustment processing of the travel direction is continued until the contact sensor 49 detects the stand 10, that is, while the mobile robot 20 moves in the travel direction. On the other hand, when the contact sensor 49 is determined to have detected the stand 10 (ST205: YES), the controller 110 stops the driving of the drive part (ST206).

According to the second embodiment, the orientation of the travel of the mobile robot 20 can be adjusted as the guide rollers R1 and R2 of the mobile robot 20 travel through the guide 11. Because the mobile robot 20 uses the mecanum wheel 31, as described above, the contact point with the installation surface of the stand 10 is the contact point C1 and is small, and a following motion may occur due to slippage. According to the embodiment, the travel direction is adjusted to travel straight in the travel direction inside the guide 11, and so the operation amount of the mobile robot 20 due to the following motion can be reduced. As a result, the time that friction is generated by the mecanum wheels 31 with the installation surface can be reduced, and the life of the mecanum wheels 31 can be improved.

Third Embodiment

A third embodiment differs from the first embodiment in that the size of the opening of the guide is defined. Accordingly, matters related to the size of the opening of the guide will now be described in detail. The same configurations as those of the first embodiment are marked with the same reference numerals; and a description of these configurations is omitted. To simplify the description of the embodiment, similarly to the second embodiment, an example is described in which the stand 10 includes one guide 11; and two guide rollers are located at the unit U1.

Figure 21:
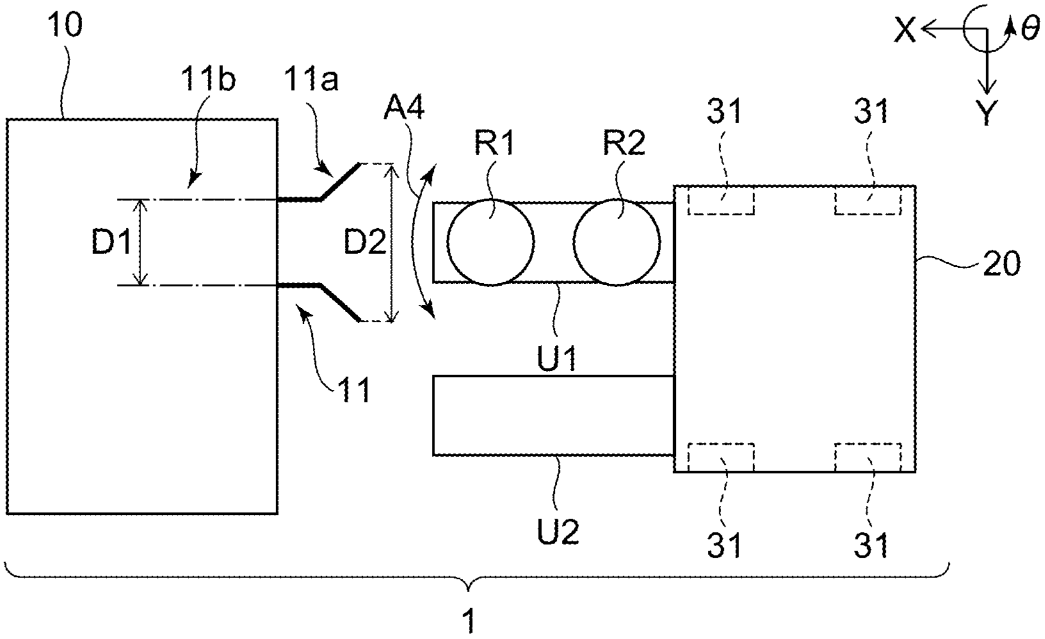
FIG. 21 is a schematic view showing an example of a schematic configuration of a mobile robot system according to a third embodiment.

FIG. 21 is a schematic view showing an example of a schematic configuration of the mobile robot system 1. As shown in FIG. 21, the mobile robot system 1 includes the stand 10 that includes the guide 11, and the mobile robot 20 that includes the units U1 and U2 at which the guide rollers R1 and R2 are arranged to face the stand 10. The guide 11 includes the opening part 11*a* and the body part 11*b*. Similarly to the first embodiment, the width of the body part is the width D1; and the width of the opening of the opening part 11*a* is the width D2 (>D1). According to the embodiment, the distance of the width D2 is defined as follows.

The mobile robot 20 estimates the position on the 2D map based on the calculation result from the laser rangefinder 50, and moves from the prescribed position to the target position. When being positioned at the target position, as described above, there are cases where the mobile robot 20 cannot accurately stop at the target position. Thus, there are cases where misalignment of the mobile robot 20 occurs when stopping; therefore, according to the embodiment, the width D2 of the opening of the guide 11 is set to a width that accounts for the error due to the misalignment as much as possible. Specifically, it is sufficient for the width D2 to be determined based on the positioning accuracy of the mobile robot 20 at the target position, the friction force of the mecanum wheels 31 with the installation surface, the weight of the workpiece W placed on the arm part 44, etc.

Even when, for example, orientation misalignment in the lateral direction occurs when the mobile robot 20 stops at the target position as illustrated by the two arrows A4 of FIG. 21, a configuration is used in which the width D2 of the opening of the guide 11 can account for the misalignment error; therefore, the guide roller R1 abuts the inner surface of the opening of the guide 11. Then, the guide roller R1 moves from the opening part 11*a* along the inner side due to the rotation of the guide roller R1 to be received in the body part 11*b*. Also, due to the travel of the mobile robot 20, similarly to the first guide roller R1, the next guide roller R2 also moves from the opening part 11*a* along the inner side of the opening part 11*a* to be received in the body part 11*b*. As a result, the guide rollers R1 and R2 are received in the body part 11*b*; and the mobile robot 20 is positioned with respect to the workpiece W placed on the stand 10.

According to the third embodiment, the opening of the guide 11 is set to have the width D2 so that the mobile robot system 1 can account for misalignment when the mobile robot 20 stops at the target position. It is therefore unnecessary to perform correction processing of the misalignment when stopping the mobile robot 20. Accordingly, for example, the adjustment processing of the misalignment when positioned at the target position according to the first embodiment (steps ST102 to ST104) can be omitted, and the transfer processing of the workpiece W by the mobile robot system 1 can be quick.

Although a configuration is described in embodiments above in which the guide rollers R1 to R6 are located at the roller base 47, the configuration is not limited thereto. For example, the guide rollers R1 to R6 may be located directly at the unit U1. The roller base 47 may be located at the unit U2 even when not located at the unit U1. Furthermore, the settings of the guide 11, the guide 12, and the guide rollers R1 to R6 are arbitrary as long as the arm part 44 can be positioned so that the workpiece W can be transferred when the guide rollers R1 to R6 are received in the body parts 11*b* and 12*b* of the guides 11 and 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions.

What is claimed is:

1. A mobile robot system, comprising:
- a placement platform on which a workpiece is placeable; and
- a mobile robot configured to transfer the workpiece to and from the placement platform,
- the placement platform including a guide,
- the guide including
  - an opening part, an opening of the opening part being greater than a prescribed width, and
  - a body part having the prescribed width,
- the mobile robot including
  - a mobile robot main body including a drive part,
  - an arm part extending from the mobile robot main body in one direction and configured to transfer the workpiece to and from the placement platform,
  - a unit extending from the mobile robot main body in the one direction, the unit including a plurality of rotatable rollers, rotation axes of the plurality of rollers being parallel to each other, the plurality of rollers being arranged along one straight line along a direction crossing an extension direction of the rotation axes, and
  - a controller configured to drive the drive part to move the mobile robot so that at least two rollers among the plurality of rollers are received in the body part of the guide,
- the guide being positioned so that the arm part can transfer the workpiece to and from the placement platform when the at least two rollers are received in the body part.

2. The system according to claim 1, wherein
- the placement platform further includes a leg part configured to support the placement platform, and
- the guide is located at a lower side of the placement platform.

3. The system according to claim 1, wherein
- the mobile robot further includes a first sensor configured to detect a stop position of the mobile robot with respect to the placement platform, and
- the controller stops an operation of the drive part when the first sensor detects the stop position.

4. The system according to claim 1, wherein
- the mobile robot further includes a stopper configured to regulate a stop position of the mobile robot with respect to the placement platform.

5. The system according to claim 1, wherein
- the drive part includes four mecanum wheels, and
- the mecanum wheels each include a plurality of barrel rollers.

6. The system according to claim 1, wherein
- at least one roller among the plurality of rollers includes a second sensor used to determine at least a width-direction force of the guide, and
- when the mobile robot moves along the body part, the controller sets a velocity so that the mobile robot moves away from where the width-direction force is detected by the second sensor.

7. The system according to claim 1, wherein
- a width of the opening of the opening part is determined based on positional and directional misalignment of the mobile robot when the mobile robot stops at a target position.

8. The system according to claim 1, wherein
- the placement platform further includes a positioning part located at a vicinity of the opening of the opening part,
- the mobile robot further includes a detecting part configured to detect the positioning part, and
- the controller adjusts positional and directional misalignment of the mobile robot based on the positioning part detected by the detecting part.

9. The system according to claim 1, wherein
- the mobile robot further includes an electric part configured to operate the arm part in a vertical direction.

* * * * *